United States Patent
Kim et al.

(10) Patent No.: US 11,190,102 B2
(45) Date of Patent: Nov. 30, 2021

(54) REGULATING CIRCUIT INCLUDING A PLURALITY OF LOW DROP OUT REGULATORS AND METHOD OF OPERATING THE SAME

(71) Applicant: Samsung Electronics Co., Ltd., Suwon-si (KR)

(72) Inventors: Ikhwan Kim, Suwon-si (KR); Takahiro Nomiyama, Seoul (KR); Jiseon Paek, Suwon-si (KR); Jaeyeol Han, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/582,401

(22) Filed: Sep. 25, 2019

(65) Prior Publication Data

US 2020/0310477 A1 Oct. 1, 2020

(30) Foreign Application Priority Data

Mar. 29, 2019 (KR) .......................... 10-2019-0037306

(51) Int. Cl.
*H02M 3/158* (2006.01)
*G05F 1/565* (2006.01)
*H02M 1/00* (2006.01)
*G05F 1/575* (2006.01)
*H02M 3/157* (2006.01)

(52) U.S. Cl.
CPC .......... *H02M 3/1584* (2013.01); *G05F 1/565* (2013.01); *G05F 1/575* (2013.01); *H02M 1/0045* (2021.05); *H02M 1/0077* (2021.05); *H02M 3/157* (2013.01)

(58) Field of Classification Search
CPC ..... G05F 1/10; G05F 1/46; G05F 1/56; G05F 1/563; G05F 1/565; G05F 1/577; G05F 1/575; G05F 1/59; G05F 1/595; G05F 1/618; H02M 2001/0045; H02M 2007/007; H02M 2001/0074; H02M 2001/0077; H02M 3/1584
See application file for complete search history.

(56) References Cited

U.S. PATENT DOCUMENTS

| | | | |
|---|---|---|---|
| 7,202,653 B2 * | 4/2007 | Pai ........................ | H02M 3/156 323/284 |
| 8,026,636 B2 | 9/2011 | Oh | |
| 8,536,845 B2 | 9/2013 | Kim et al. | |
| 8,836,302 B2 | 9/2014 | Chen | |

(Continued)

FOREIGN PATENT DOCUMENTS

| | | |
|---|---|---|
| JP | 2005124269 A | 5/2005 |
| KR | 20180128223 A | 12/2018 |

*Primary Examiner* — Gustavo A Rosario-Benitez
(74) *Attorney, Agent, or Firm* — Harness, Dickey & Pierce, P.L.C.

(57) ABSTRACT

A regulating circuit including a first direct current (DC)-DC converter configured to apply a first supply voltage to a first node in a first mode and apply the first supply voltage to a second node in a second mode, a first low drop output (LDO) regulator connected to the first node, the first LDO regulator configured to provide an output voltage to an output node by regulating the first supply voltage of the first node, and a second LDO regulator connected to the first node, the second LDO regulator configured to provide an auxiliary current to the first node in the second mode may be provided.

19 Claims, 14 Drawing Sheets

(56) References Cited

U.S. PATENT DOCUMENTS

| | | | |
|---|---|---|---|
| 9,673,699 B1 | 6/2017 | Vivian et al. | |
| 2006/0290203 A1* | 12/2006 | Muller | H02M 3/158 |
| | | | 307/11 |
| 2008/0067995 A1* | 3/2008 | Chua-Eoan | H02M 3/158 |
| | | | 323/284 |
| 2008/0122416 A1* | 5/2008 | Cowell | G05F 1/56 |
| | | | 323/280 |
| 2010/0060078 A1* | 3/2010 | Shaw | G05F 1/56 |
| | | | 307/31 |
| 2010/0219687 A1* | 9/2010 | Oh | G05F 1/46 |
| | | | 307/39 |
| 2012/0274134 A1* | 11/2012 | Gasparini | H02M 3/1584 |
| | | | 307/31 |
| 2015/0130292 A1* | 5/2015 | Yeon | B60L 53/305 |
| | | | 307/104 |
| 2016/0334818 A1* | 11/2016 | Singh | G05F 1/56 |
| 2018/0032095 A1* | 2/2018 | Lee | G05F 1/575 |
| 2018/0188756 A1* | 7/2018 | Siao | G05F 1/461 |
| 2018/0198416 A1* | 7/2018 | Hur | H03F 3/193 |
| 2019/0372460 A1* | 12/2019 | Cuenca | G05F 1/56 |
| 2019/0384337 A1* | 12/2019 | Lu | G05F 1/565 |
| 2020/0212802 A1* | 7/2020 | Chang | G06F 1/263 |
| 2020/0304021 A1* | 9/2020 | Khlat | H02M 3/158 |

* cited by examiner

FIG. 5

|     | Md1 | Md2 | Md3 | Md4 |
|-----|-----|-----|-----|-----|
| SW1 | ON  | OFF | ON  | OFF |
| SW2 | OFF | OFF | OFF | ON  |
| SW3 | OFF | ON  | OFF | OFF |
| SW4 | ON  | ON  | OFF | OFF |
| SW5 | OFF | OFF | ON  | ON  |

REGULATING CIRCUIT INCLUDING A PLURALITY OF LOW DROP OUT REGULATORS AND METHOD OF OPERATING THE SAME

CROSS-REFERENCE TO RELATED APPLICATION

This application claims the benefit of Korean Patent Application No. 10-2019-0037306, filed on Mar. 29, 2019, in the Korean Intellectual Property Office, the disclosure of which is incorporated herein in its entirety by reference.

BACKGROUND

The inventive concepts relate to a regulating circuits for supplying a voltage by using a plurality of low drop output (LDO) regulators and a converter, and/or methods of operating the same.

In general, the regulating circuit converts power input from the outside into direct current (DC) power desired by a system by using power switches. A power regulator included in a regulating circuit may be, for example, a DC-DC converter for increasing or decreasing a voltage of the input DC power. The LDO regulator as a linear regulator that operates at a low input and output potential difference is referred to as a low damage-type linear regulator or a low saturation-type linear regulator. Therefore, in order to output the same voltage, a low input voltage may be desired by the LDO regulator.

In particular, the LDO regulator may include a load capacitor. In accordance with the size of the load capacitor, a magnitude of a ripple voltage and a time for which an output voltage is stabilized may be in a trade-off relationship. Therefore, a structure of the regulating circuit capable of decreasing the ripple voltage without increasing the size of the load capacitor included in the LDO regulator is desired.

SUMMARY

The inventive concepts provide regulating circuits for providing a stable output voltage by decreasing a ripple voltage by using a plurality of low drop output (LDO) regulators and a converter, and/or methods of operating the same.

The inventive concepts also provides regulating circuits for providing a stable voltage to a plurality of nodes by using a plurality of DC-DC converters, and/or methods of operating the same.

According to an example embodiment of the inventive concepts, a regulating circuit may include a first direct current (DC)-DC converter configured to apply a first supply voltage to a first node in a first mode and apply the first supply voltage to a second node in a second mode, a first low drop output (LDO) regulator connected to the first node, the first LDO regulator configured to provide an output voltage to an output node by regulating the first supply voltage of the first node, and a second LDO regulator connected to the first node, the second LDO regulator configured to provide an auxiliary current to the first node in the second mode.

According to an example embodiment of the inventive concepts, a regulating circuit may include a first direct current (DC)-DC current configured to provide a first supply voltage, a switching circuit configured to connect an output end of the first DC-DC converter to one of a first node or a second node based on a mode setting signal, a first low drop output (LDO) regulator configured to provide an output voltage to an output node by regulating a voltage of the first node, and a second LDO regulator configured to increase a voltage level of the first node to that of the first supply voltage by supplying an output current to the first node when the first DC-DC converter is connected to the second node.

According to an example embodiment of the inventive concepts, a method of operating a regulating circuit for supplying an output voltage by regulating a voltage of a first node may include switching an output end of a first direct current (DC)-DC converter from the first node to a second node, applying an auxiliary current to the first node by a first low drop output (LDO) regulator, and supplying the output voltage by regulating a voltage of the first node by a second LDO regulator.

BRIEF DESCRIPTION OF THE DRAWINGS

Embodiments of the inventive concepts will be more clearly understood from the following detailed description taken in conjunction with the accompanying drawings in which:

FIG. 5 is a table illustrating a switching operation of a regulating circuit according to an example embodiment of the inventive concepts;

DETAILED DESCRIPTION

Figure 1:
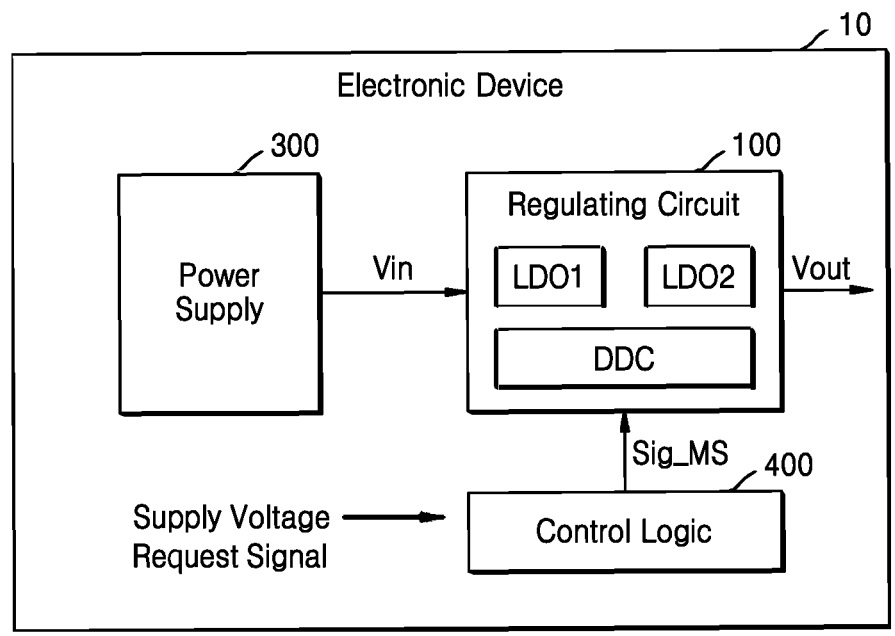
FIG. 1 is a block diagram illustrating an electronic device according to an example embodiment of the inventive concepts.

FIG. 1 is a block diagram illustrating an electronic device 10 according to an example embodiment of the inventive concepts.

Referring to FIG. 1, the electronic device 10 may include a regulating circuit 100, a power supply 300, and a control logic 400. The power supply 300 may generate a plurality of power voltages based on an external power voltage, and provide an input voltage Vin among the plurality of power voltages to the regulating circuit 100.

The regulating circuit 100 may include a first low drop out (LDO) regulator LDO1, a second LDO regulator LDO2, and a direct current (DC)-DC converter DDC, and generate an output voltage Vout by regulating the input voltage Vin received from the power supply 300. In an example embodiment, the regulating circuit 100 may receive a mode setting signal Sig_MS from the control logic 400, and provide various voltages to a plurality of nodes based on the mode setting signal Sig_MS. The control logic 400 may generate the mode setting signal Sig_MS in response to a supply voltage request signal for at least one of the plurality of nodes.

The DC-DC converter DDC may receive the DC input voltage Vin, increases or decreases the DC input voltage Vin, and output a DC voltage. In an example, the DC-DC converter DDC may be implemented by a step-down converter or a buck converter. In an example embodiment, the DC-DC converter DDC may provide a voltage to the plurality of nodes based on the mode setting signal Sig_MS. In an example embodiment, the DC-DC converter DDC may decrease the input voltage Vin based on the mode setting signal Sig_MS received from the control logic 400, and provide the decreased input voltage Vin to the first LDO regulator LDO1 or another device through a first node or a second node.

The first LDO regulator LDO1 may provide the output voltage Vout having a particular value by regulating the decreased voltage received from the DC-DC converter DDC to another device or a functional block of the electronic device 10.

The second regulator LDO2 may be connected to the first LDO regulator LDO1 through the first node. According to an example embodiment, the DC-DC converter DDC may stop providing a voltage to the first LDO regulator LDO1. In an example embodiment, as described above, the DC-DC converter DDC may provide the voltage to the second node, instead of the first node connected to the first LDO regulator LDO1, based on the mode setting signal Sig_MS.

Each of the first LDO regulator LDO1 and the second LDO regulator LDO2 may include a load capacitor, an amplifier for amplifying a difference between a reference voltage and a feedback voltage, and a power transistor for providing a final output voltage based on an output voltage of the amplifier. In an example embodiment, the first LDO regulator LDO1 and the second LDO regulator LDO2 may include different kinds of power transistors. In an example embodiment, the first LDO regulator LDO1 may include an n-channel metal-oxide semiconductor (NMOS) transistor as the power transistor, and the second LDO regulator LDO2 may include a p-channel metal-oxide semiconductor (PMOS) transistor as the power transistor.

According to some example embodiments of the inventive concepts, the second LDO regulator LDO2 may output an auxiliary current to the first node in a period in which the DC-DC converter DDC does not provide the voltage, and accordingly, a voltage level of the first node may not be decreased. Thus, even in the period in which the DC-DC converter DDC does not provide the voltage, a stable voltage may be input to the first LDO regulator LDO1.

Figure 2:
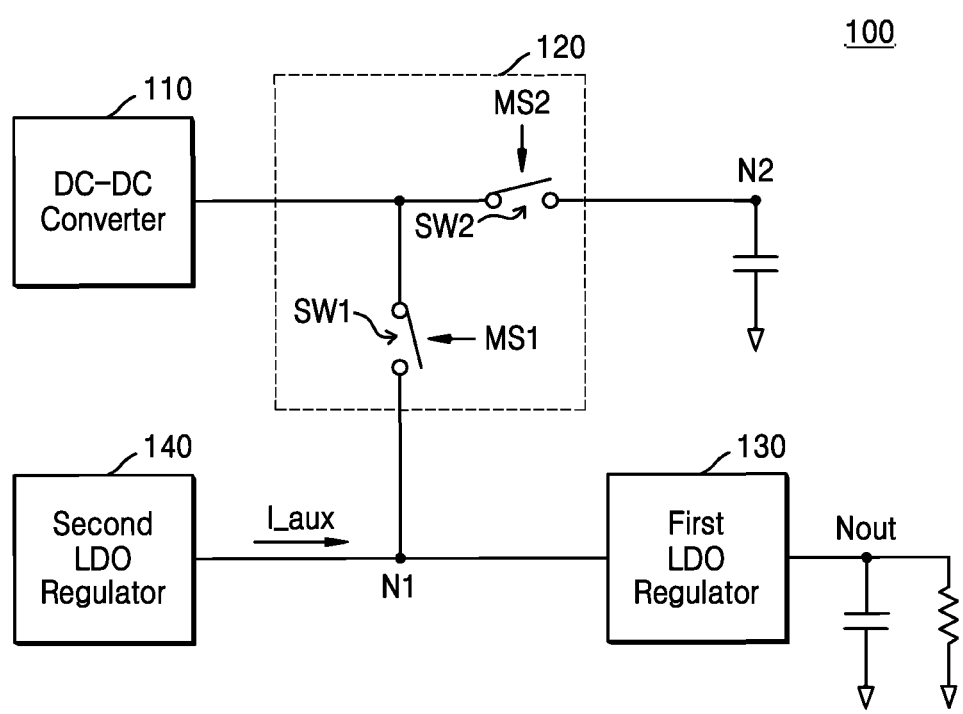
FIG. 2 is a circuit diagram illustrating a regulating circuit according to an example embodiment of the inventive concepts.

FIG. 2 is a circuit diagram illustrating a regulating circuit 100 according to an example embodiment of the inventive concepts. Description previously given with reference to FIG. 1 is omitted.

Referring to FIG. 2, the regulating circuit 100 may include a DC-DC converter 110, a switching circuit 120, a first LDO regulator 130, and a second LDO regulator 140. The DC-DC converter 110 may be connected to a first node N1 and a second node N2 through the switching circuit 120. The switching circuit 120 may include a first switch SW1 and a second switch SW2. The first switch SW1 may electrically connect or disconnect the DC-DC converter 110 and the first node N1 based on a first mode signal MS1. The second switch SW2 may electrically connect or disconnect the DC-DC converter 110 and the second node N2 based on a second mode signal MS2. In an example embodiment, the first mode signal MS1 and the second mode signal MS2 may be received from the control logic 400 (FIG. 1) as the mode setting signals Sig_MS.

The first switch SW1 and the second switch SW2 may be configured by various switch devices that are capable of controlling electrical connections based on external signals. In an example, the first switch SW1 and the second switch SW2 may be configured by transistors. In an example embodiment, the first switch SW1 and the second switch SW2 may complementarily operate.

In an example, in a first mode, the first switch SW1 may be shorted (in other words, turned-on) and the second switch SW2 may be opened (in other words, turned-off), and thus, the DC-DC converter 110 may be connected to the first node N1. Therefore, a supply voltage provided from the DC-DC converter 110 may be provided to the first LDO regulator 130 through the first node N1. Further, in a second mode, the first switch SW1 may be opened and the second switch SW2 may be shorted and accordingly, the DC-DC converter 110 may be connected to the second node N2. Therefore, the supply voltage provided from the DC-DC converter 110 may be provided to an external device through the second node N2.

The first LDO regulator 130 may generate an output voltage by regulating a voltage of the first node N1, and provide the generated output voltage to the external device through an output node Nout. In the first mode, the first LDO regulator 130 may generate the output voltage by receiving the supply voltage provided from the DC-DC converter 110 through the first node N1 and regulating the received supply voltage.

In the second mode, the second LDO regulator 140 may output an auxiliary current I_aux to the first node N1. Thus, even when the first switch SW1 is opened, a phenomenon that no voltage is supplied to the first node N1, may be avoided. The first LDO regulator 130 may generate the output voltage by receiving a voltage from the second LDO regulator 140 through the first node N1 and regulating the received voltage.

According to some example embodiments of the inventive concepts, like in the above-described second mode, even when the DC-DC converter 110 does not provide a supply voltage to the first LDO regulator 130 but provides to another node in accordance with an additional request, the first LDO regulator 130 may receive a voltage from the second LDO regulator 140. Therefore, a stable output voltage may be generated.

In FIG. 2, an example in which connections between the DC-DC converter 110 and the first node N1 and the second node N2 are controlled by the two switches SW1 and SW2 is illustrated. However, example embodiments of the inventive concepts are not limited thereto. According to some example embodiments, connections between the DC-DC converter 110 and the first node N1 and the second node N2 may be controlled through more than two switch devices.

Figure 3:
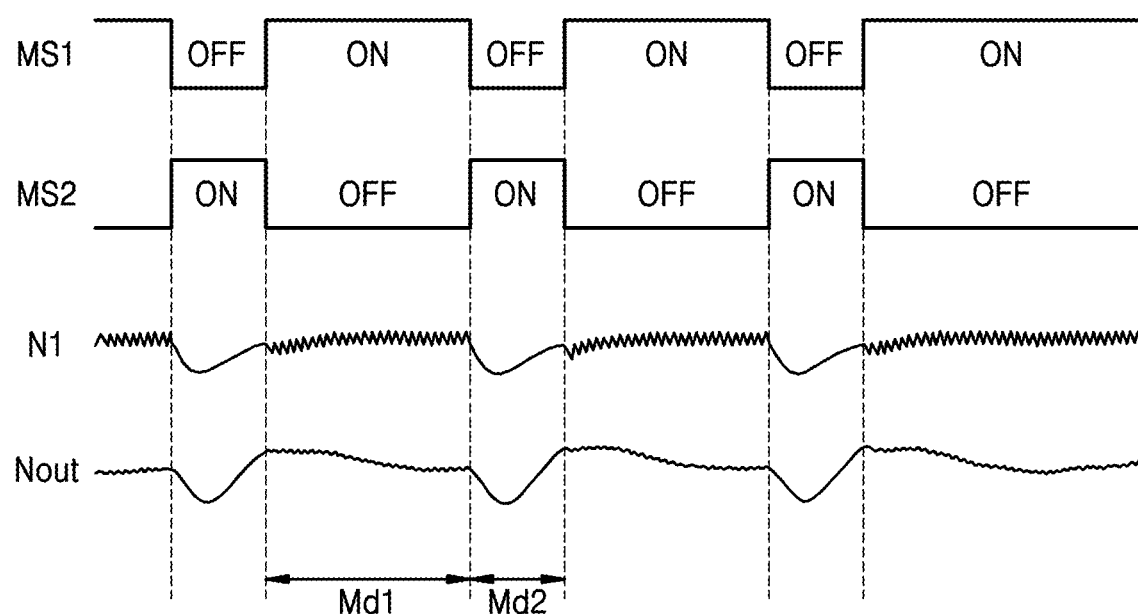
FIG. 3 is a timing diagram illustrating an operation of a regulating circuit according to an example embodiment of the inventive concepts.

FIG. 3 is a timing diagram illustrating an operation of a regulating circuit according to an example embodiment of the inventive concepts. The X axis of FIG. 3 illustrates time, and the Y axis of FIG. 3 illustrates an electric potential of a node or a logic level of a signal.

Referring to FIGS. 2 and 3, in a first mode Md1, the first mode signal MS1 may maintain logic high, and the second mode signal MS2 may maintain logic low. The first switch SW1 may be shorted (ON), and the second switch SW2 may be opened (OFF) based on the first mode signal MS1 and the second mode signal MS2. Therefore, the DC-DC converter 110 may be connected to the first node N1 and a supply voltage having a stable ripple may be provided to the first node N1, and thus a voltage of the output node Nout may also have a stable ripple.

As a mode changes from the first mode Md1 to a second mode Md2, the first mode signal MS1 may be transitioned from logic high to logic low and the second mode signal MS2 may be transitioned transited from logic low to logic high. The first switch SW1 may be opened (OFF) and the second switch SW2 may be shorted (ON) based on the first mode signal MS1 and the second mode signal MS2. Therefore, the DC-DC converter 110 is connected to the second node N2 and the supply voltage may be provided to the second node N2.

Because the supply voltage is not provided to the first node N1, levels of the voltage of the first node N1 and a voltage of the output node Nout, which is generated by regulating the voltage of the first node N1, may temporarily decrease. However, the voltage level of the first node N1 may be recovered to be the same as or substantially similar to that in the first mode Md1 by the second LDO regulator 140 outputting the auxiliary current I_aux. Further, the level of the voltage of the output node Nout, which is generated by regulating the voltage of the first node N1, may be recovered to be the same as or substantially similar to that in the first mode Md1.

According to some example embodiments of the inventive concepts, even in the second mode Md2 in which the supply voltage of the DC-DC converter 110 is not provided to the first note N1, the voltage of the output node Nout may have a stable ripple by the second LDO regulator 140 by providing the auxiliary current I_aux.

Figure 4:
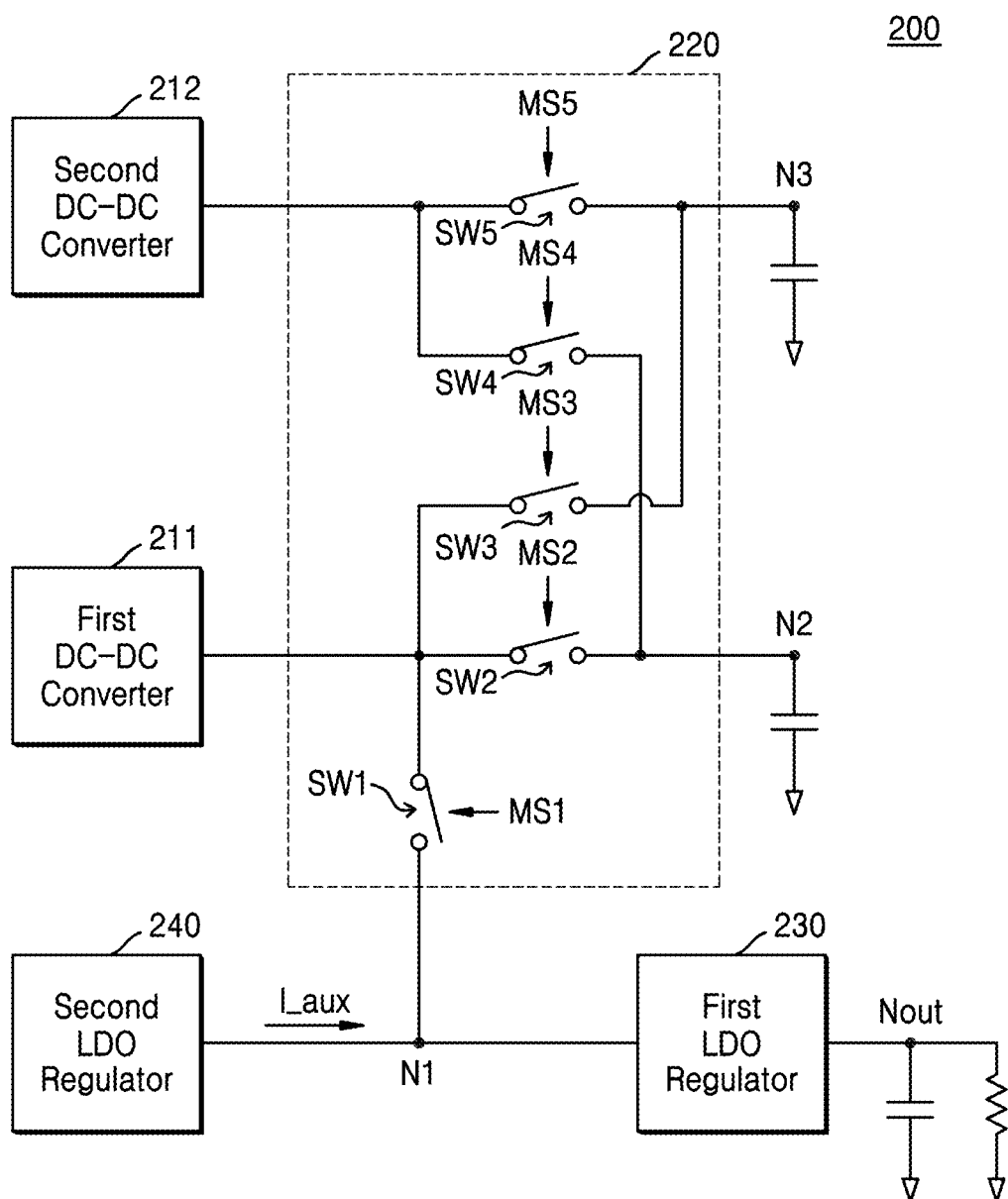
FIG. 4 is a circuit diagram illustrating a regulating circuit according to an example embodiment of the inventive concepts.

FIG. 4 is a circuit diagram illustrating a regulating circuit 200 according to an example embodiment of the inventive concepts. Description previously given with reference to FIG. 2 is omitted.

Referring to FIG. 4, the regulating circuit 200 may include a first DC-DC converter 211, a second DC-DC converter 212, a switching circuit 220, a first LDO regulator 230, and a second LDO regulator 240. Because operations of the first DC-DC converter 211, the first LDO regulator 230, and the second LDO regulator 240 are the same as or substantially similar to those of the DC-DC converter 110, the first LDO regulator 130, and the second LDO regulator 140 of FIG. 2, description previously given with reference to FIG. 2 is omitted.

The switching circuit 220 may include first to fifth switches SW1 to SW5. Because the first switch SW1 and the second switch SW2 are described in detail with reference to FIG. 2, description thereof is omitted. The third switch SW3 may electrically connect or disconnect the first DC-DC converter 211 and a third node N3 based on a third mode signal MS3 Likely, the fourth switch SW4 may electrically connect or disconnect the second DC-DC converter 212 and the second node N2 based on a fourth mode signal MS4, and the fifth switch SW5 may electrically connect or disconnect the second DC-DC converter 212 and the third node N3 based on a fifth mode signal MS5.

The first to fifth switches SW1 to SW5 may be configured by various switch devices that are capable of controlling electrical connections based on external signals (for example, the first to fifth mode signals MS1 to MS5). In an example, the first to fifth switches SW1 to SW5 may be configured by transistors. In an example embodiment, the first to fifth mode signals MS1 to MS5 may be received from the control logic 400 (FIG. 1) as the mode setting signals Sig_MS.

In accordance with an operation of the switching circuit 220, the first DC-DC converter 211 may be connected to one of the first node N1, the second node N2, or the third node N3, and may supply a first supply voltage to one of the first node N1, the second node N2, or the third node N3. The second DC-DC converter 212 may be connected to at least one of the second node N2 or the third node N3, and may provide a second supply voltage to at least one of the second node N2 or the third node N3. In an example embodiment, the second supply voltage provided by the second DC-DC converter 212 may have a level higher or lower than that of the first supply voltage provided by the first DC-DC converter 211.

According to an example embodiment of the inventive concepts, when the second DC-DC converter 212 provides a voltage for the plurality of nodes (for example, the second node N2 and the third node N3), the first DC-DC converter 211 may not be connected to the first node N1 and may be connected to another node (e.g., the second node N2 or the third node N3). That is, before the second DC-DC converter 212 applies the second supply voltage to the second node N2 and the third node N3, the first DC-DC converter 211 may first increase and decrease a voltage level of the second node N2 or the third node N3. The voltage level of the second node N2 or the third node N3 may be increased and decreased within a short time.

Further, according to an embodiment of the inventive concepts, even when the first DC-DC converter 211 is used for increasing and decreasing the voltage level of another node (e.g., the second node N2 or the third node N3), instead of increasing and decreasing the voltage level of the first node N1, the second LDO regulator 240 may maintain the voltage level of the first node N1, and thus the first LDO regulator 230 may stably provide an output voltage to the output node Nout.

FIG. 4 illustrates an example in which the regulating circuit 200 provides a voltage to the outside (e.g., other devices in the electronic device 10 (FIG. 1) through the three nodes Nout, N2, and N3. However, example embodiments of the inventive concepts are not limited thereto. In some example embodiments, the regulating circuit 200 may provide the voltage to the outside through more or less than three nodes.

The control logic 400 may provide the second mode signal MS2 and the third mode signal MS3 based on (or alternatively, in response to) a supply voltage request signal for at least one of the second node or the third node. In other words, the regulating circuit may receive the second mode signal MS2 and the third mode signal MS3 that have been generated based on (or alternatively, in response to) a supply voltage request signal for at least one of the second node or the third node.

FIG. 5 is a table illustrating a switching operation of a regulating circuit according to an example embodiment of the inventive concepts. FIGS. 6A to 6D are circuit diagrams illustrating operations of the regulating circuit 200 of FIG. 4s.

Referring to FIGS. 4 and 5, the regulating circuit 200 may operate in one of the first mode Md1, the second mode Md2, a third mode Md3, and a fourth mode Md4. In the first mode Md1, the first DC-DC converter 211 may apply the first supply voltage to the first node N1, and the second DC-DC converter 212 may apply the second supply voltage to the second node N2.

In the second mode Md2, in accordance with a request of the control logic 400 (FIG. 1), the second DC-DC converter 212 may apply the second supply voltage to the second node N2, and the first DC-DC converter 211 may apply the first supply voltage to the third node N3.

In the third mode Md3, after the third node N3 has the first supply voltage in the second mode Md2, the second DC-DC converter 212 may apply the second supply voltage to the third node N3 and the first DC-DC converter 211 may apply the first supply voltage to the first node N1 again.

In the fourth mode Md4, in accordance with a request of the control logic 400 (FIG. 1), the second DC-DC converter 212 may apply the second supply voltage to the third node N3 and the first DC-DC converter 211 may apply the first supply voltage to the second node N2.

After the fourth mode Md4, the operation in the first mode Md1 may be performed again, and the operations in the first mode Md1 to the fourth mode Md4 may be repeated.

Figure 6A:
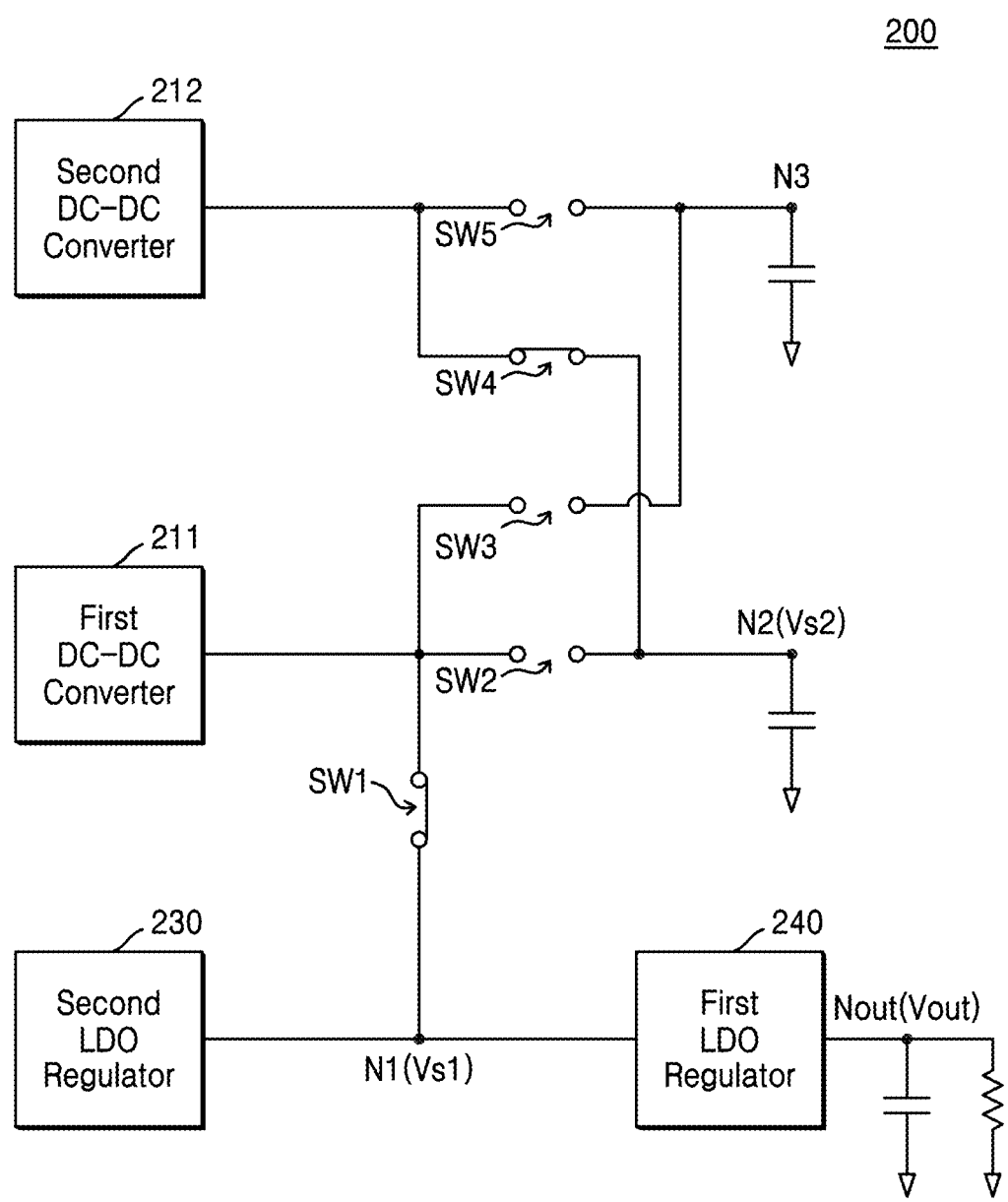
FIGS. 6A to 6D are circuit diagrams illustrating operations of the regulating circuit of FIG. 4.

FIG. 6A illustrates an example in which the regulating circuit 200 operates in the first mode Md1. Referring to FIGS. 5 and 6A, in the first mode Md1, the first switch SW1 and the fourth switch SW4 are shorted (ON) and the second switch SW2, the third switch SW3, and the fifth switch SW5 may be opened (OFF).

As the first switch SW1 is shorted, the first DC-DC converter 211 may provide the first supply voltage Vs1 to the first node N1. The first LDO regulator 240 may provide an output voltage Vout to the output node Nout by regulating the first supply voltage Vs1 of the first node N1. As the fourth switch SW4 is shorted, the second DC-DC converter 212 may supply the second supply voltage Vs2 to the second node N2. The third node N3 may maintain a floating state.

Figure 6B:
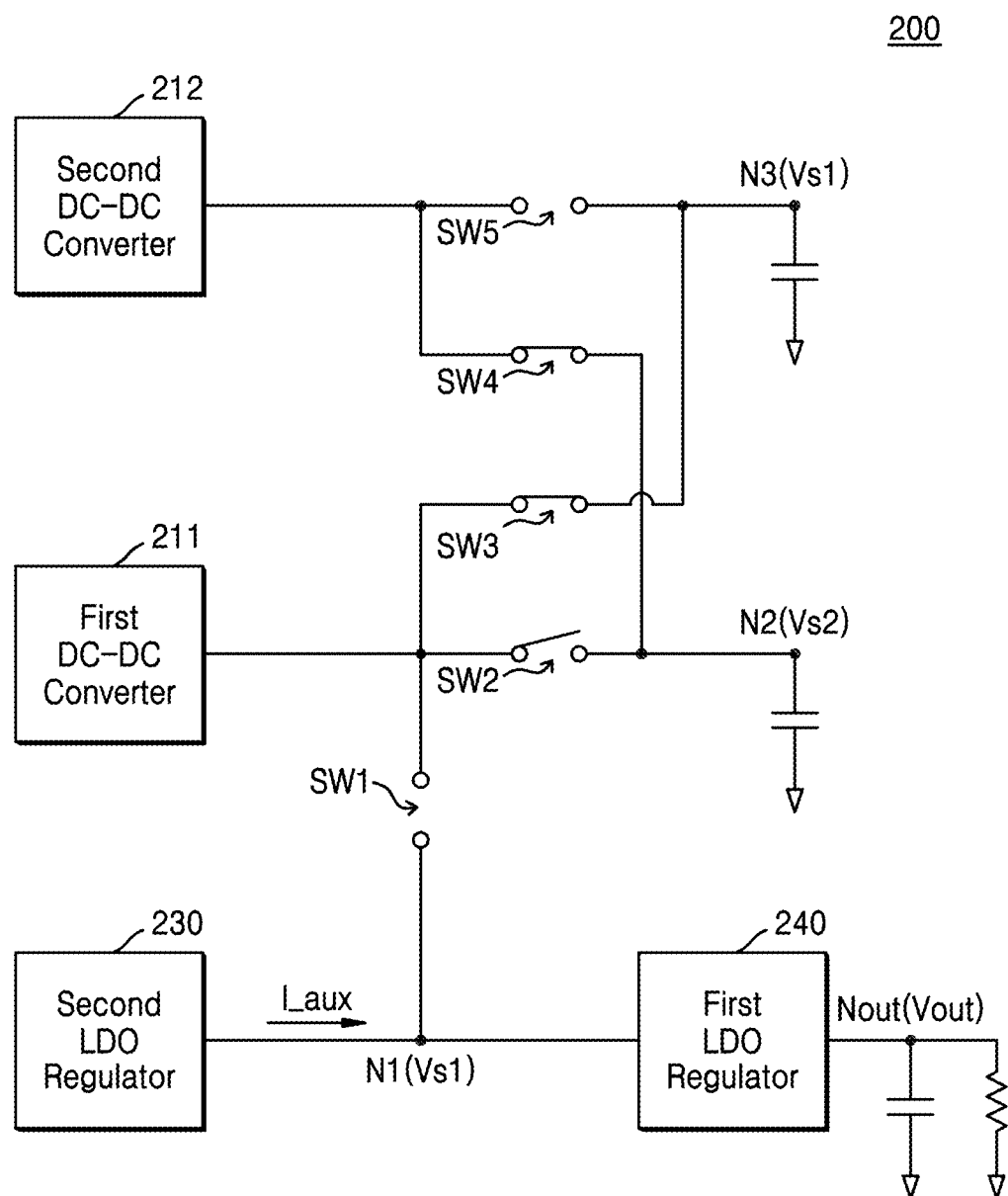

FIG. 6B illustrates an example in which the regulating circuit 200 operates in the second mode Md2. Referring to FIGS. 5 and 6B, in the second mode Md2, the third switch SW3 and the fourth switch SW4 are shorted (ON) and the first switch SW1, the second switch SW2, and the fifth switch SW5 may be opened (OFF).

As the fourth switch SW4 is shorted, the second DC-DC converter 212 may supply the second supply voltage Vs2 to the second node N2. As the third switch SW3 is shorted, the first DC-DC converter 211 may supply the first supply voltage Vs1 to the third node N3. A connection between the first node N1 and the first DC-DC converter 211 may be cut off. A voltage level of the first supply voltage Vs1 may be recovered by the auxiliary current I_aux generated by the second LDO regulator 230. Therefore, although the connection between the first node N1 and the first DC-DC converter 211 is cut off, the first LDO regulator 240 may provide the output voltage Vout to the output node Nout by regulating the first supply voltage Vs1 of the first node N1.

Figure 6C:
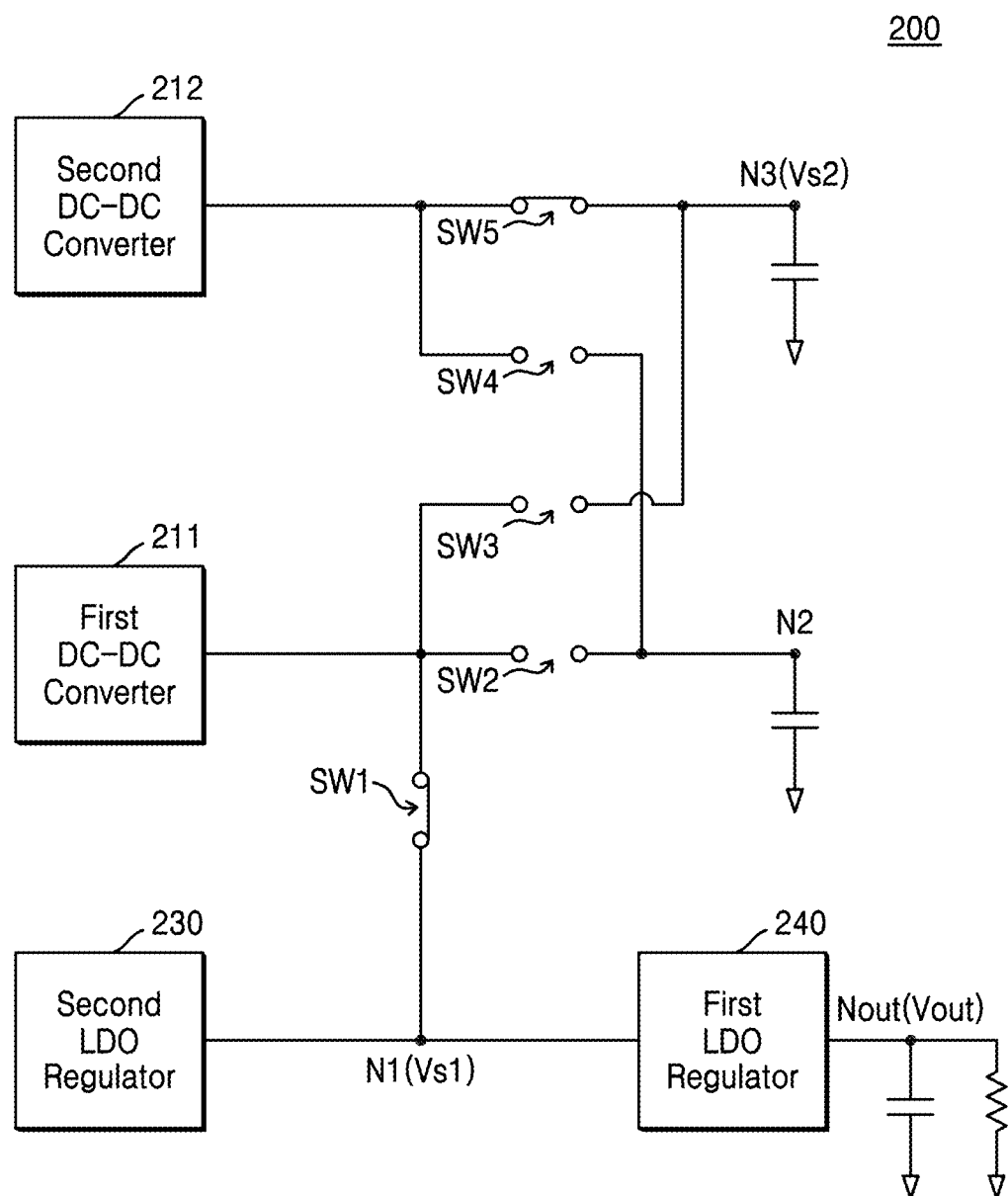

FIG. 6C illustrates an example in which the regulating circuit 200 operates in the third mode Md3. Referring to FIGS. 5 and 6C, in the third mode Md3, the first switch SW1 and the fifth switch SW5 are shorted (ON) and the second switch SW2, the third switch SW3, and the fourth switch SW4 may be opened (OFF).

As the first switch SW1 is shorted, the first DC-DC converter 211 may provide the first supply voltage Vs1 to the first node N1. The first LDO regulator 240 may stably provide the output voltage Vout to the output node Nout by regulating the first supply voltage Vs1 of the first node N1. As the fifth switch SW5 is shorted, the second DC-DC converter 212 may supply the second supply voltage Vs2 to the third node N3.

Figure 6D:
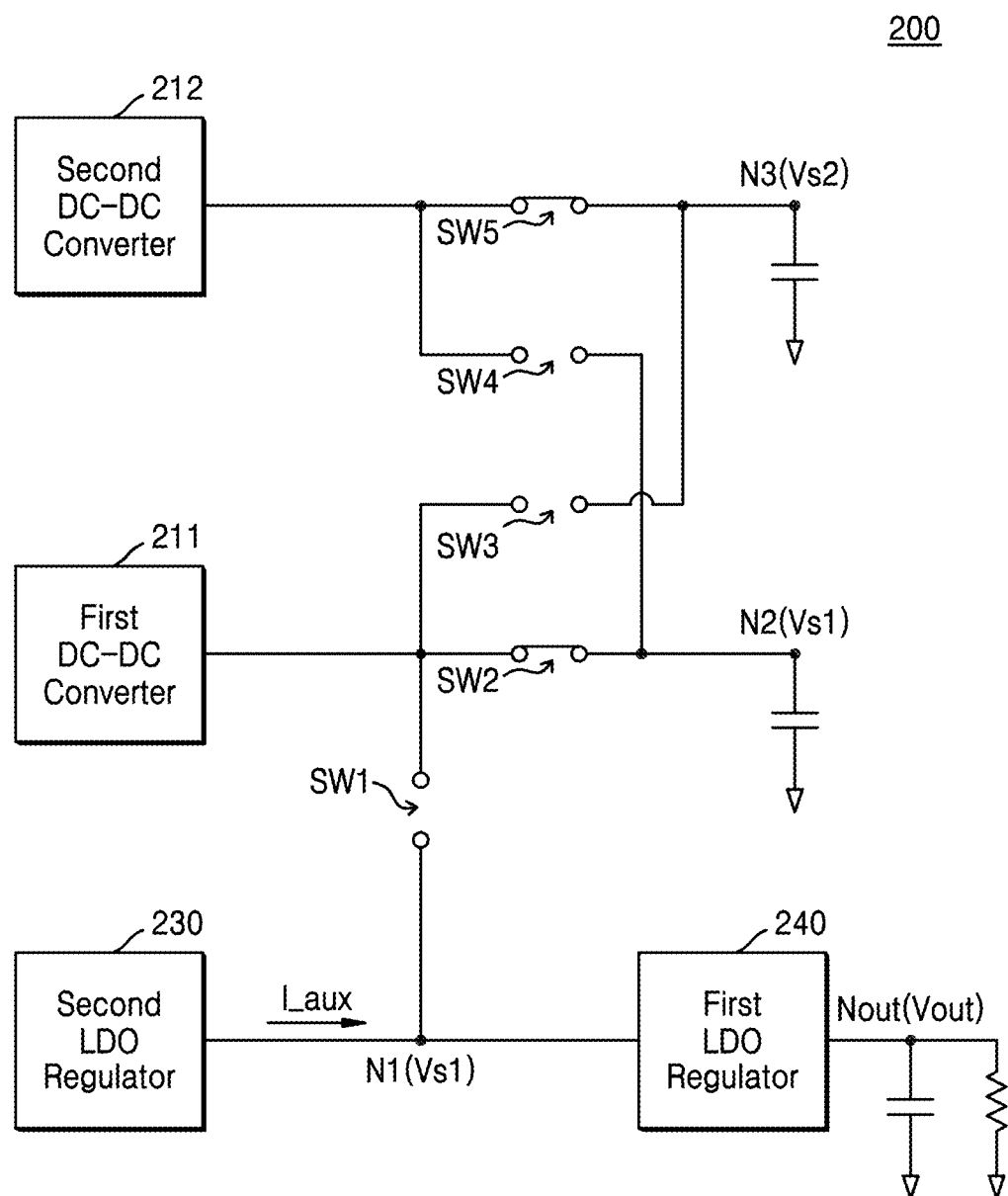

FIG. 6D illustrates an example in which the regulating circuit 200 operates in the fourth mode Md4. Referring to FIGS. 5 and 6D, in the fourth mode Md4, the second switch SW2 and the fifth switch SW5 are shorted (ON) and the first switch SW1, the third switch SW3, and the fourth switch SW4 may be opened (OFF).

As the fifth switch SW5 is shorted, the second DC-DC converter 212 may supply the second supply voltage Vs2 to the third node N3. As the second switch SW2 is shorted, the first DC-DC converter 211 may supply the first supply voltage Vs1 to the second node N2. The connection between the first node N1 and the first DC-DC converter 211 may be cut off. The voltage level of the first supply voltage Vs1 may be recovered by the auxiliary current I_aux generated by the second LDO regulator 230. Therefore, although the connection between the first node N1 and the first DC-DC converter 211 is cut off, the first LDO regulator 240 may provide the output voltage Vout to the output node Nout by regulating the first supply voltage Vs1 of the first node N1.

Figure 7:
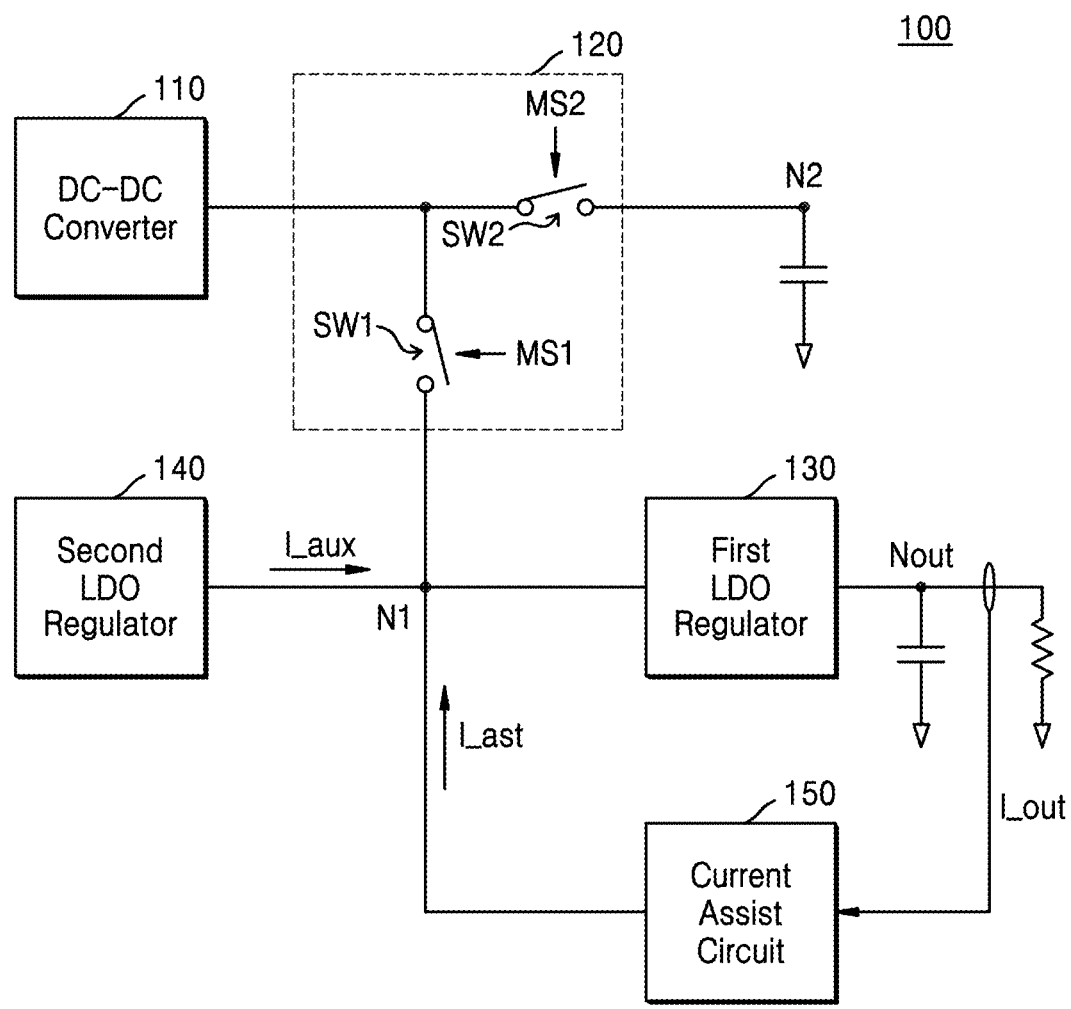
FIG. 7 is a view illustrating a regulating circuit according to an example embodiment of the inventive concepts.

FIG. 7 is a view illustrating a regulating circuit 100 according to an example embodiment of the inventive concepts. Description previously given with reference to FIG. 2 is omitted.

Referring to FIG. 7, the regulating circuit 100 may include the DC-DC converter 110, the switching circuit 120, the first LDO regulator 130, the second LDO regulator 140, and a current assist circuit 150. Because the DC-DC converter 110, the switching circuit 120, the first LDO regulator 130, and the second LDO regulator 140 are described in detail with reference to FIG. 2, description thereof is omitted.

The current assist circuit 150 may sense an output current I_out of the output node Nout, and may output an assist current I_ast to the first node N1 based on the sensed output current I_out. In an example embodiment, the current assist circuit 150 may include a current mirror circuit. During transition from the first mode to the second mode, charges may be stored in a capacitor of the first node N1 in order to provide an output current leaks toward an output node, thereby compensating a temporary decrease of a voltage level of the first node N1.

According to an example embodiment of the inventive concepts, the current assist circuit 150 may output the assist current I_ast in a period in which the voltage level of the first node N1 is temporarily decreased. Therefore, the voltage level of the first node N1 may not be decreased, thereby maintaining the first supply voltage. As a result, in spite of the transition from the first mode to the second mode, a stable voltage with a smallest ripple may be applied to the first LDO regulator 130 and the output voltage may be also stably maintained.

FIG. 7 illustrates an example embodiment in which the current assist circuit 150 senses a current applied to the output node Nout. However, example embodiments of the inventive concepts are not limited thereto. In some example embodiment, the current assist circuit 150 may sense a current applied to the first LDO regulator 130 or a current applied to the second node N2, and may apply the assist current I_ast to the first node N1 based on the sensed current.

Figure 8:
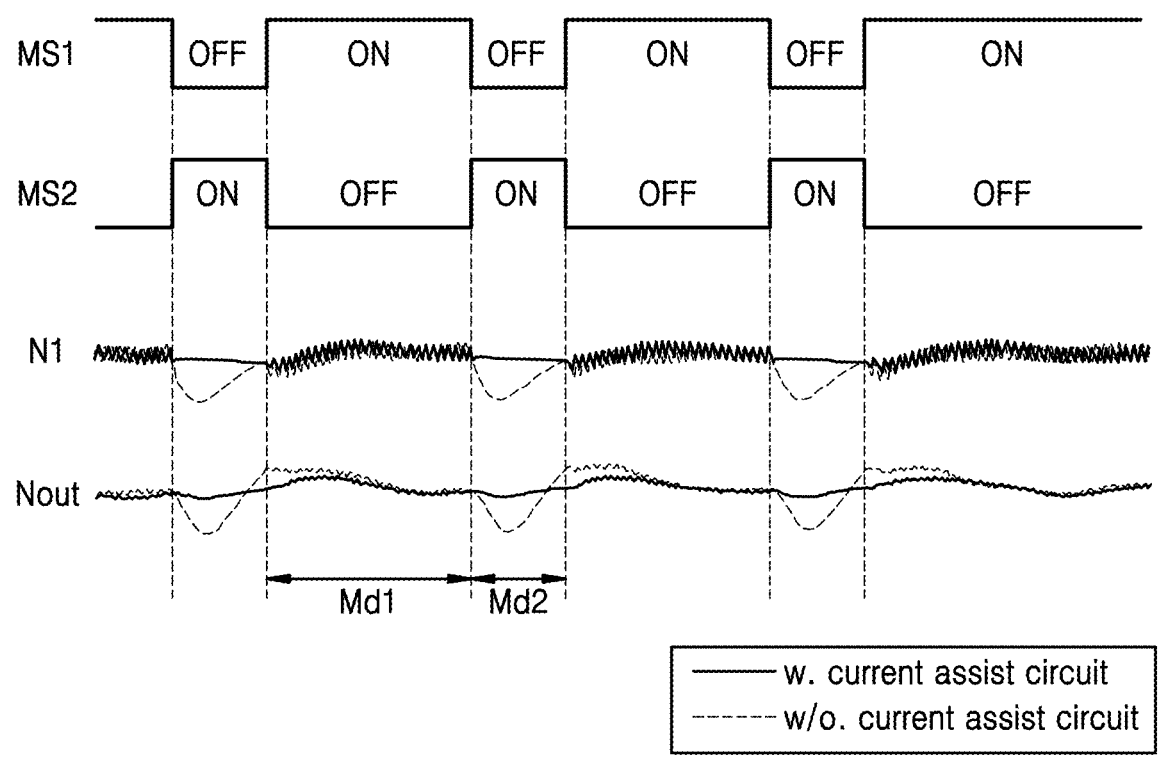
FIG. 8 is a timing diagram illustrating an operation of a regulating circuit according to an example embodiment of the inventive concepts.

FIG. 8 is a timing diagram illustrating an operation of a regulating circuit according to an example embodiment of the inventive concepts. The X axis of FIG. 8 illustrates time and the Y axis of FIG. 8 illustrates an electric potential of a node or a logic level of a signal. Description previously given with reference to FIG. 3 is omitted.

Referring to FIGS. 7 and 8, dashed lines illustrate an operation of the regulating circuit 100 without the current assist circuit 150 and solid lines illustrate an operation of the regulating circuit 100 with the current assist circuit 150. Because the dashed lines may be the same as or substantially similar to the graphs of FIG. 3, description thereof will be omitted.

During transition from the first mode Md1 to the second mode Md2, the second LDO regulator 140 may have a long stabilizing time. Therefore, when the current assist circuit 150 is omitted, the voltage levels of the first node N1 and the output node Nout may temporarily decrease.

In an example embodiment, the current assist circuit 150 may have a shorter current supply time than the second LDO regulator 140. Therefore, before the second LDO regulator 140 outputs the auxiliary current I_aux to the first node N1, the current assist circuit 150 may output the assist current I_ast to the first node N1.

According to an example embodiment of the inventive concepts, after the connection between the first node N1 and the DC-DC converter 110 is cut off, the first node N1 may uniformly maintain the voltage level by the assist current I_ast. Then, the first node N1 may uniformly maintain the voltage level by the stably output auxiliary current I_aux. As the voltage with the smallest ripple (or alternatively, ripple having a reduced height) is applied to the first node N1, the voltage level of the output node Nout may be stably maintained.

Figure 9:
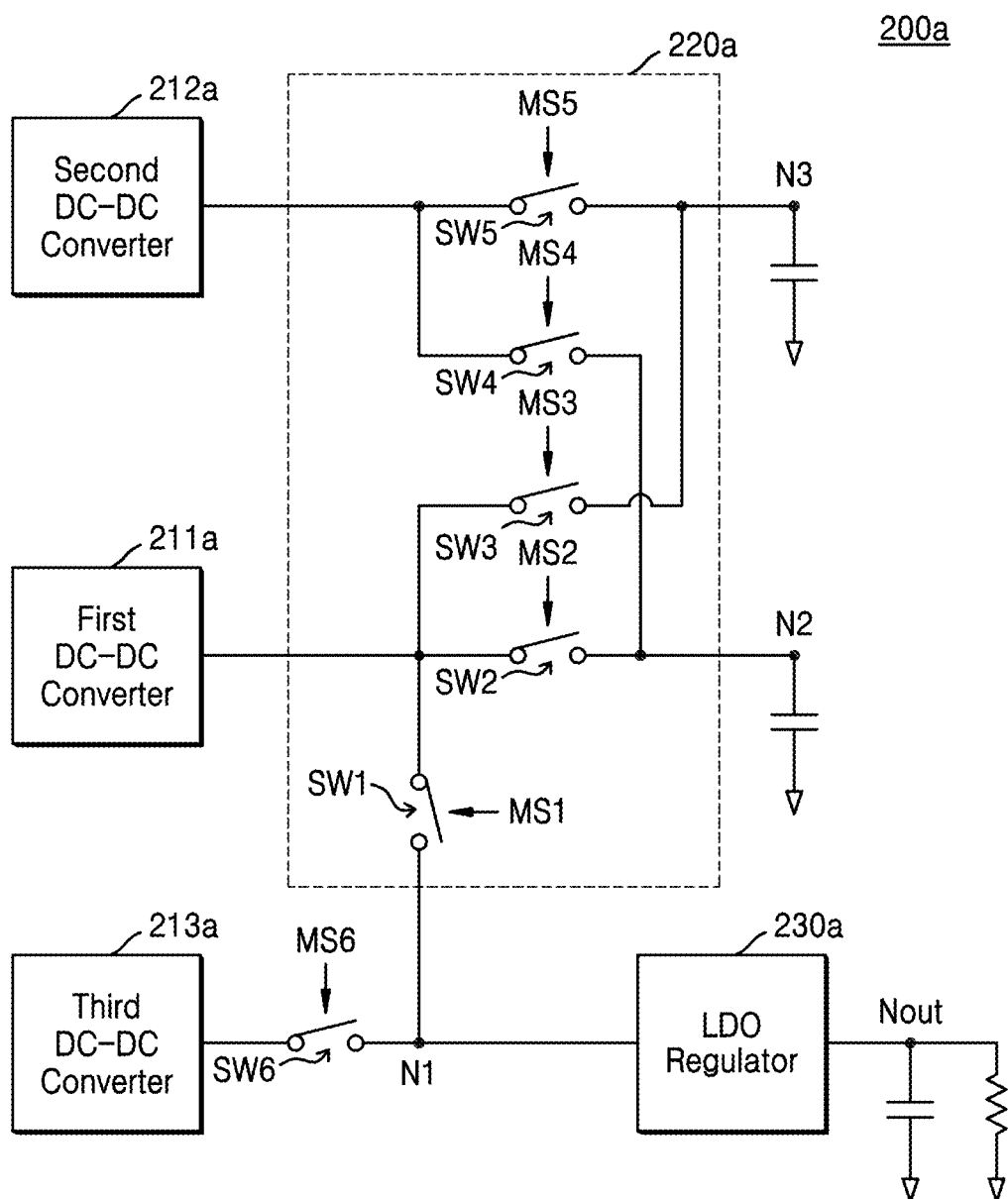
FIG. 9 is a block diagram illustrating a regulating circuit according to an example embodiment of the inventive concepts.

FIG. 9 is a block diagram illustrating a regulating circuit 200a according to an example embodiment of the inventive concepts. Description previously given with reference to FIG. 4 is omitted.

Referring to FIG. 9, the regulating circuit 200a may include a first DC-DC converter 211a, a second DC-DC converter 212a, a third DC-DC converter 213a, a switching circuit 220a, a sixth switch SW6, and an LDO regulator 230a. Because operations of the first DC-DC converter 211a, the second DC-DC converter 212a, the switching circuit 220a, and the LDO regulator 230a are the same as or substantially similar to those of the first DC-DC converter 211, the second DC-DC converter 212, the switching circuit 220, and the first LDO regulator 230 of FIG. 4, description previously given with reference to FIG. 4 is omitted.

An operation of the third DC-DC converter 213a is similar to that of the second LDO regulator 240 of FIG. 4. In the second mode in which a connection between the first DC-DC regulator 211a and the first node N1 is cut off, the third DC-DC regulator 213a is connected to the first node N1, and may provide the first supply voltage to the first node N1. The third DC-DC regulator 213a may provide an output voltage (e.g., the first supply voltage), which is the same as or substantially similar to that of the first DC-DC regulator 211a. Therefore, even when the first DC-DC regulator 211a does not provide a voltage to the LDO regulator 230a, the LDO regulator 230a may receive the first supply voltage from the third DC-DC regulator 213a. In an example, the third DC-DC regulator 213a may be configured by a step-down converter or a buck converter.

The sixth switch SW6 may electrically connect or disconnect the third DC-DC regulator 213a and the first node N1 based on a sixth mode signal MS6. In an example embodiment, the sixth switch SW6 may complementarily operate with the first switch SW1. That is, when the first switch SW1 is opened, the sixth switch SW6 may be shorted, and when the first switch SW1 is shorted, the sixth switch SW6 may be opened.

Figure 10:
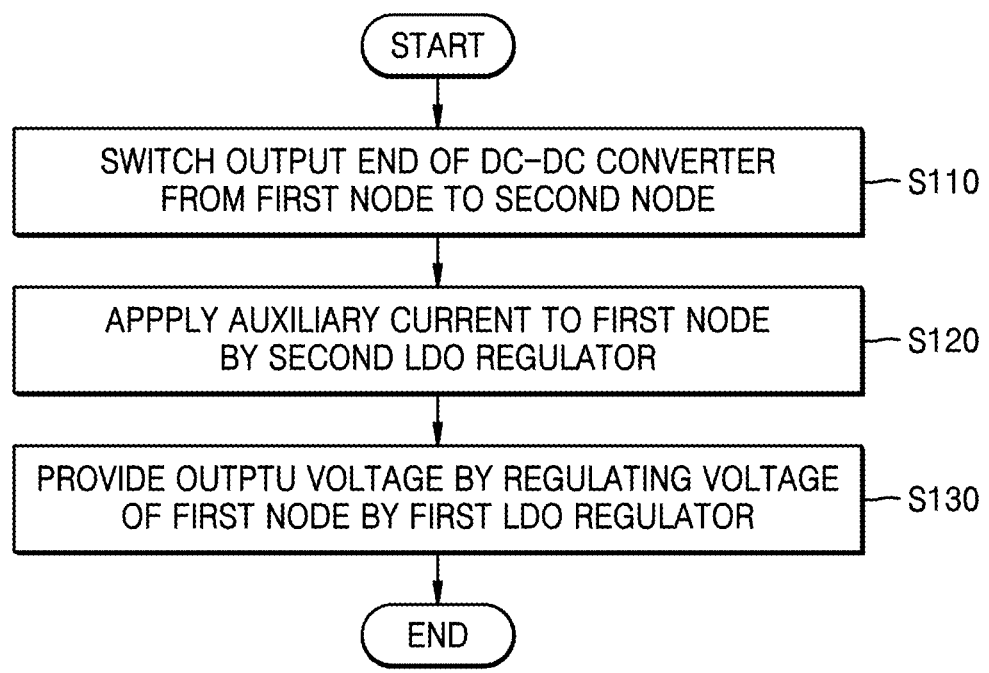
FIG. 10 is a flowchart illustrating a method of operating a regulating circuit, according to an example embodiment of the inventive concepts.

FIG. 10 is a flowchart illustrating a method of operating a regulating circuit 100, according to an example embodiment of the inventive concepts.

Referring to FIGS. 2 and 10, the regulating circuit 100 may switch an output end of the DC-DC converter 110 from the first node N1 to the second node N2 in operation S110. When the connection between the first node N1 and the DC-DC converter 110 is cut off, the second LDO regulator 140 may apply the auxiliary current I_aux to the first node N1 in operation S120. The first LDO regulator 130 may provide an output voltage to the output node Nout by regulating the voltage of the first node N1.

Figure 11:
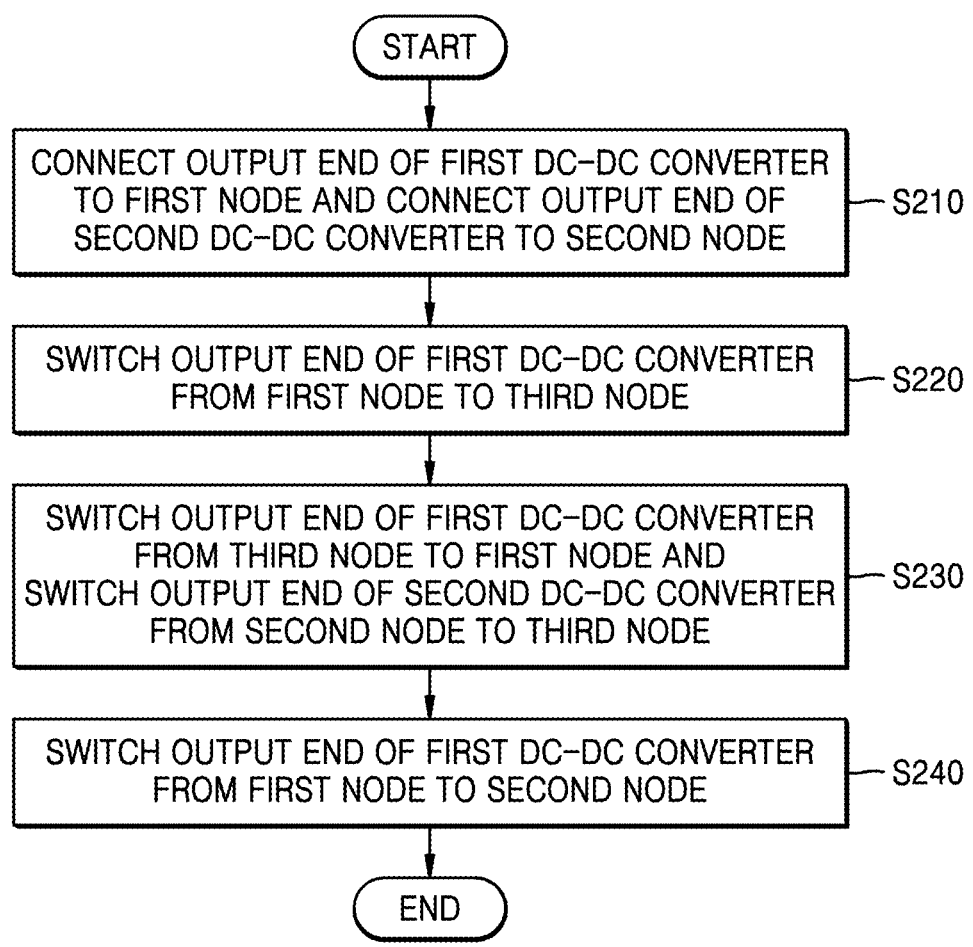
FIG. 11 is a flowchart illustrating a method of operating a regulating circuit, according to an example embodiment of the inventive concepts.

FIG. 11 is a flowchart illustrating a method of operating a regulating circuit, according to an example embodiment of the inventive concepts.

Referring to FIGS. 4 and 11, in the first mode, the regulating circuit 100 may connect an output end of the first DC-DC converter 211 to the first node N1, and may connect an output end of the second DC-DC converter 212 to the second node N2 in operation S210. In the second mode, the regulating circuit 100 may switch an output end of the first DC-DC converter 211 from the first node N1 to the third node N3 in operation S220. In the third mode, the regulating circuit 100 may switch the output end of the first DC-DC converter 211 from the third node N3 to the first node N1 and may switch the output end of the second DC-DC converter 212 from the second node N2 to the third node N3 in operation S230. In the fourth mode, the regulating circuit 100 may switch the output end of the first DC-DC converter 211 from the first node N1 to the second node N2 in operation S240.

Figure 12:
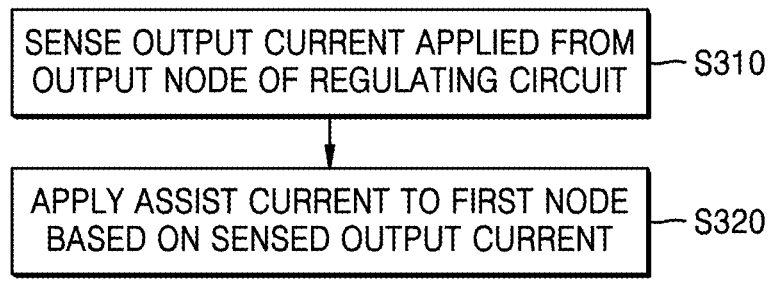
FIG. 12 is a flowchart illustrating a method of operating a current assist circuit, according to an example embodiment of the inventive concepts.

Therefore, the first node N1 may have the first supply voltage by the auxiliary current I_aux generated by the second LDO regulator 230, the second node N2 may have the first supply voltage by the first DC-DC converter 211, and the third node N3 may have the second supply voltage by the second DC-DC converter 212. Then, the first DC-DC converter 211 may be switched from the second node N2 to the first node N1, and may operate in the first mode. FIG. 12 is a flowchart illustrating a method of operating a current assist circuit, according to an example embodiment of the inventive concepts.

Referring to FIGS. 7 and 12, the current assist circuit 150 may sense an output current applied from or to the output node Nout of the regulating circuit 100. The current assist circuit 150 may apply the assist current I_ast to the first node N1 based on the sensed output current.

Figure 13:
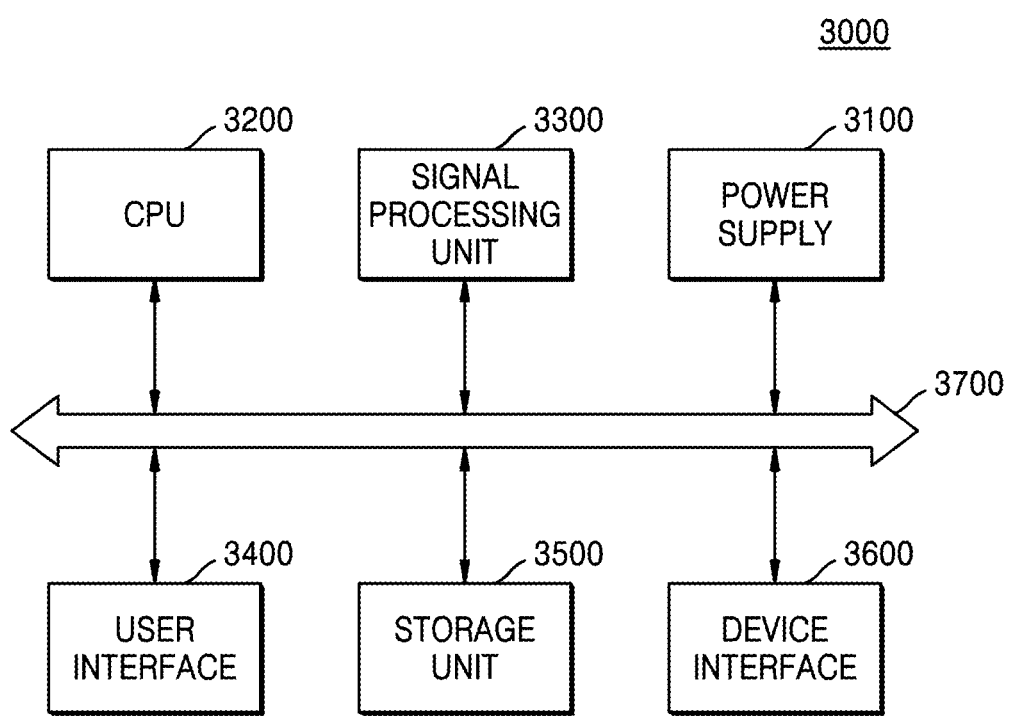
FIG. 13 is a block diagram illustrating an electronic device, according to an example embodiment of the inventive concepts.

FIG. 13 is a block diagram illustrating an electronic device 3000 according to an example embodiment of the inventive concepts.

Referring to FIG. 13, the electronic device 3000 may include a power supply 3100, a central processing unit (CPU) 3200, a signal processing unit 3300, a user interface 3400, a storage unit or a memory 3500, a device interface 3600, and a bus 3700.

The electronic device 3000 may be, for example, a computer, a mobile phone, a personal digital assistant (PDA), a portable media player (PMP), an MP3 player, a camera, a camcorder, a TV set, or a display device.

The power supply 3100 may generate a power voltage for the electronic device 3000, and may supply the generated power voltage to the respective elements. The regulating circuit 100 according to an example embodiment of the inventive concepts may be applied to the power supply 3100. For example, the power supply 3100 may include a plurality of LDO regulators, and may stably manage a voltage level of an output voltage even when a DC-DC converter supplies a voltage to another node (in other words, even when a DC-DC converter does not supply a voltage to the first node).

The CPU 3200 may control the electronic device 3000. For example, the CPU 3200 may control the elements of the electronic device 3000 based on information input through the user interface 3400.

The signal processing unit 3300 may process a signal received through the device interface 3600 or a signal read from the storage unit 3500 in accordance with a determined standard. For example, the signal processing unit 3300 may process a video signal or an audio signal.

The user interface 3400 may be an input device for a user setting information for setting a function of the electronic device 3000 and operating the electronic device 3000. The storage unit 3500 may store various information items needed for operating the electronic device 3000. Further, data received through the device interface 3600 or data items processed by the electronic device 3000 may be stored in the storage unit 3500.

The device interface 3600 may perform data communication with an external device connected to the electronic device 3000 by wire or wirelessly. The bus 3700 may transmit information among the elements of the electronic device 3000.

While the inventive concepts have been particularly shown and described with reference to some example embodiments thereof, it will be understood that various changes in form and details may be made therein without departing from the spirit and scope of the following claims.

What is claimed is:

1. A regulating circuit comprising:
a first direct current (DC)-DC converter configured to generate a first supply voltage, apply the first supply voltage to a first node in a first mode via a first switch, and apply the first supply voltage to a second node in a second mode via a second switch;
a first low drop output (LDO) regulator connected to the first node, the first LDO regulator configured to be selectively connected to the first DC-DC converter via the first switch to receive the first supply voltage, the first LDO regulator configured to provide an output voltage to an output node by regulating the first supply voltage; and
a second LDO regulator directly connected to the first node, the second LDO regulator configured to provide an auxiliary current to the first node when the first DC-DC converter does not apply the first supply voltage to the first node via the first switch and supplies the first supply voltage to the second node via the second switch.

2. The regulating circuit of claim 1, further comprising:
the control logic configured to generate a first mode signal corresponding to the first mode, a second mode signal corresponding to the second mode, and a third mode signal corresponding to a third mode, wherein the first switch is configured to electrically connect or disconnect the first node and the first DC-DC converter based on the first mode signal,
the second switch is configured to electrically connect or disconnect the second node and the first DC-DC converter based on the second mode signal, and
the first DC-DC converter is further configured to apply the first supply voltage to a third node via a third switch based on the third mode signal.

3. The regulating circuit of claim 2, further comprising:
a second DC-DC converter configured to provide a second supply voltage to the second node in the first mode via a fourth switch and provide the second supply voltage to the third node in the second mode via a fifth switch.

4. The regulating circuit of claim 3, wherein
the fourth switch configured to electrically connect or disconnect the second node and the second DC-DC converter based on the first mode signal and the third mode signal; and
the fifth switch configured to electrically connect or disconnect the third node and the second DC-DC converter based on a fourth mode signal corresponding to a fourth mode and the second mode signal.

5. The regulating circuit of claim 3, wherein
the regulating circuit is configured to receive the second mode signal and the third mode signal generated based on a supply voltage request signal for at least one of the second node or the third node.

6. The regulating circuit of claim 5, further comprising:
a switching circuit including the first switch and the second switch, the switching circuit configured to connect or disconnect the first DC-DC converter and the second node based on the second mode signal, and connect or disconnect the second DC-DC converter to the second node based on the first mode signal or the third mode signal.

7. The regulating circuit of claim 1, further comprising:
a current assist circuit connected to the first node and the output node, the current assist circuit configured to sense a current of the output node and provide an assist current to the first node when the first DC-DC converter does not supply the first supply voltage to the first node via the first switch and supplies the first supply voltage to the second node via the second switch.

8. The regulating circuit of claim 7, wherein
the current assist circuit is a current mirror configured to sense the current of the output node and determine a current level of the assist current based on the sensed current.

9. The regulating circuit of claim 1, wherein
the first LDO regulator and the second LDO regulator comprise different kinds of metal oxide semiconductor (MOS) transistors.

10. The regulating circuit of claim 9, wherein
the first LDO regulator comprises at least one n-channel MOS (NMOS) transistor, and
the second LDO regulator comprises at least one p-channel MOS (PMOS) transistor.

11. A regulating circuit comprising:
a first direct current (DC)-DC converter configured to generate a first supply voltage;
a switching circuit including a first switch and a second switch, the first switch configured to connect or disconnect an output end of the first DC-DC converter to a first node and the second switch configured to connect or disconnect the output end of the first DC-DC converter to a second node based on a mode setting signal;
a first low drop output (LDO) regulator configured to provide an output voltage to an output node by regulating the first supply voltage on the first node; and
a second LDO regulator directly connected to the first node, the second LDO regulator configured to maintain a level of the first supply voltage by supplying a current to the first node when the first DC-DC converter is not connected to the first node and connected to the second node and supplies the first supply voltage to the second node.

12. The regulating circuit of claim 11, further comprising:
a second DC-DC converter configured to generate a second supply voltage,
wherein the switching circuit includes a fourth switch and a fifth switch, the fourth switch configured to connect or disconnect an output end of the second DC-DC converter to the second node and the fifth switch configured to connect or disconnect the output end of the second DC-DC converter to a third node based on the mode setting signal.

13. The regulating circuit of claim 12, wherein the switching circuit includes a third switch configured to connect or disconnect the output end of the first DC-DC converter to the third node, based on the mode setting signal.

14. The regulating circuit of claim 11, further comprising:
a current assist circuit connected to the first node and the output node, the current assist circuit configured to sense a current of the output node and apply an assist current to the first node based on the sensed current when the first switch disconnects the output of the first DC-DC converter to the first node and the second switch connects the output of the first-DC-DC converter to the second node.

15. A method of operating a regulating circuit for supplying an output voltage to an output node by regulating a voltage of a first node, the method comprising:

switching an output end of a first direct current (DC)-DC converter from the first node to a second node;
applying an auxiliary current to the first node by a first low drop output (LDO) regulator directly connected to the first node in response to a disconnection between the output end of the first DC-DC converter and the first node and a connection between the output end of the first DC-DC converter and the second node; and
supplying the output voltage by regulating the voltage of the first node by a second LDO regulator.

16. The method of claim 15, further comprising:
switching an output end of a second DC-DC converter from a third node to the second node; and
switching the output end of the first DC-DC converter from the second node to the first node.

17. The method of claim 16, further comprising:
applying an assist current generated by a current assist circuit to the first node.

18. The method of claim 17, wherein the applying an assist current comprises:
sensing a current of the output node; and
applying the assist current, a current level of which has been determined based on the sensed current of the output node, to the first node in response to a disconnection between the output end of the first DC-DC converter and the first node and a connection between the output end of the first DC-DC converter and the second node.

19. The method of claim 17, wherein
the applying the assist current is performed after the switching the output end of the first DC-DC converter from the first node to the second node.

* * * * *